United States Patent [19]

Wolfgruber et al.

[11] Patent Number: 4,935,484
[45] Date of Patent: Jun. 19, 1990

[54] SILICONE RESIN POWDER AND A PROCESS FOR PREPARING THE SAME

[75] Inventors: Matthias Wolfgruber; Bernward Deubzer; Volker Frey, all of Burghausen, Fed. Rep. of Germany

[73] Assignee: Wacker-Chemie GmbH, Munich, Fed. Rep. of Germany

[21] Appl. No.: 194,358

[22] Filed: May 16, 1988

[30] Foreign Application Priority Data

May 21, 1987 [DE] Fed. Rep. of Germany ....... 3717073

[51] Int. Cl.$^5$ .............................................. C08G 77/04
[52] U.S. Cl. ...................................... 528/34; 528/10; 528/33; 524/837
[58] Field of Search ............................. 528/10, 33, 34; 524/837

[56] References Cited

U.S. PATENT DOCUMENTS

| | | | |
|---|---|---|---|
| 3,208,972 | 9/1965 | Lyons | 528/10 |
| 3,433,780 | 3/1969 | Cekada et al. | 525/477 |
| 3,627,851 | 12/1971 | Brady | 528/32 |
| 3,634,321 | 1/1972 | Nugent et al. | 528/10 |
| 3,668,180 | 6/1972 | Brennan et al. | 524/837 |
| 3,691,128 | 9/1972 | Vincent | 528/10 |
| 4,331,525 | 5/1982 | Huba et al. | 204/182.4 |
| 4,424,297 | 1/1984 | Bey | 524/714 |
| 4,761,454 | 8/1988 | Oba et al. | 524/862 |

*Primary Examiner*—John C. Bleutge
*Assistant Examiner*—Ralph H. Dean, Jr.

[57] ABSTRACT

Silicone resin powders are obtained by spray drying aqueous colloidal suspensions of organopolysiloxanes which are prepared by adding an alkoxysilane and/or a partial hydrolysate thereof and, if appropriate, mixed with an organo(poly)siloxane which is free of alkoxy groups and contains a maximum of 8 siloxane units per molecule, to water in the presence of an emulsifier at a maximum rate of 5 moles of organosilicon compound per hour per liter of water.

4 Claims, No Drawings

SILICONE RESIN POWDER AND A PROCESS FOR PREPARING THE SAME

The present invention relates to silicone resin powders and more particularly to a process for preparing silicone resin powders by spray drying aqueous colloidal suspensions of organopolysiloxanes.

BACKGROUND OF THE INVENTION

Polymethylsesquioxane powders are described in U.S. Pat. No. 4,528,390 to Kimura in which the powders are prepared by hydrolytic condensation of methyltrimethoxysilane in an ammoniacal medium with subsequent washing and drying of the precipitate.

Nugent describes in U.S. Pat. No. 3,383,773 a process for preparing reproducible solid powdered solvent-soluble prepolymers of organopolysiloxanes which are prepared by hydrolytic condensation of methyltrialkoxysilanes and phenyltrialkoxysilanes. In this process, the organopolysiloxanes are dissolved in methylene chloride and spray-dried.

Therefore, it is an object of the present invention to provide silicone resin powders having a particle size in the range of from 1 to 100 μm, and having a large available surface area with narrow grain-size distribution. Another object of the invention is to provide silicone resin powders having good flow properties, and whose chemical composition and functionality of the siloxane units can be varied. Still another object of the invention is to provide a process for preparing finely divided silicone resin powders without using complex mechanical grinding equipment and without sorting or filtration steps. A further object of the present invention is to provide a process for preparing finely divided silicone resin powders which are reproducible from batch to batch.

SUMMARY OF THE INVENTION

The foregoing objects and others which will become apparent from the following description are accomplished in accordance with this invention, generally speaking, by providing silicone resin powders, which are obtained by spray-drying aqueous colloidal suspensions of organopolysiloxanes that are prepared by adding at least one alkoxysilane and/or a partial hydrolysate thereof and, if appropriate, mixed with an organo(poly)siloxane which is free of alkoxy groups and contains a maximum of 8 siloxane units per molecule, to water in the presence of an emulsifier at a maximum rate of 5 moles of organosilicon compound per hour per liter of water.

The invention further relates to a process for preparing silicone resin powders which comprises spray-drying aqueous colloidal suspensions of organopolysiloxanes which are obtained by adding at least one alkoxysilane and/or a partial hydrolysate thereof and, if appropriate, mixed with an organo(poly)siloxane which is free of alkoxy groups and contains a maximum of 8 siloxane units per molecule, to water in the presence of an emulsifier at a maximum rate of 5 moles of organosilicon compound per hour per liter of water.

DESCRIPTION OF THE INVENTION

The silicone resin powders of this invention are obtained from aqueous colloidal suspensions of organopolysiloxanes which are solid at room temperature and have units of the formula

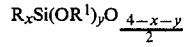

where R may be the same or different and represents a hydrogen atom or a monovalent hydrocarbon radical which has from 1 to 8 carbon atoms per radical and which may contain substituents which are inert to water, $R^1$ which may be the same or different represents a hydrogen atom or an alkyl or alkoxyalkylene radical having from 1 to 4 carbon atoms per radical, x is 0, 1, 2 or 3, and more preferably an average of from 1.0 to 2.0, y is 0, 1 or 2 and more preferably an average of from 0.0 to 0.5. The silicone resin powders of this invention are obtained from only those organopolysiloxanes which are solid at room temperature and which do not tend to melt or form films under the influence of the drying conditions.

The aqueous colloidal suspensions of organopolysiloxanes which are solid at room temperature and which are employed to prepare the silicone resin powders of this invention have an average particle diameter of 10 to 150 nm.

The aqueous colloidal suspensions of organopolysiloxanes which are solid at room temperature and which are used to prepare the silicone resin powders of this invention are described in, for example, U.S. Pat. No. 3,433,780 to Cekada, Jr. et al, U.S. Pat. No. 4,424,297 to Bey, and in German Patent Application No. P 37 17 075.9.

In the process for preparing the silicone resin powders of this invention, silanes or mixtures of silanes of the formula $R_xSi(OR^2)_{4-x}$ are employed, where R and x are the same as above, and $R^2$ may be the same or different and represents an alkyl or alkoxyalkylene radical having from 1 to 4 carbon atoms per radical or radicals of the formulas —COCH$_3$, —COC$_2$H$_5$ or —CH$_2$CH$_2$OH,.

If only a single type of silane is used, x must, of course, have a value of 1.

Mixtures of at least two different silanes having the above formula, where the values of x are different, are preferably used.

Mixtures of silanes of the formulas RSi(OR$^2$)$_3$ and R$_2$Si(OR$^2$)$_2$ in which R and R$^2$ are the same as above, are preferably employed in a molar ratio of from 0.4 to 2.3.

In preparing the silicone resin powders of this invention, it is possible to employ partial hydrolysates of the abovementioned silanes or silane mixtures having up to 10 Si atoms per partial hydrolysate.

Of course, silanes or mixtures of silanes or partial hydrolysates of these silanes or silane mixtures which result in organopolysiloxanes that are solid at room temperature are used.

In order to prepare the silicone resin powders of this invention, organo(poly)siloxanes which are free of alkoxy groups and have a maximum of 8 siloxane units per molecule can be employed, if mixed with at least one alkoxysilane and/or partial hydrolysates thereof. Organo(poly)siloxanes having a maximum of 8 siloxane units per molecule which can be used are, for example, linear organo(poly)siloxanes of the formula $$R_3SiO(SiR_2O)_nSiR_3$$

where R is the same as above and n is 0 or an integer of from 1 to 6. In the formula, n is preferably 0, and hexamethyldisiloxane is a preferred example of such an organo(poly)siloxane. Organo(poly)siloxanes having a maximum of 8 siloxane units per molecule which can also be used are, for example, cyclic organo(poly)siloxanes of the formula $$(R_2SiO)_m$$

where R is the same as above and m is an integer of from 3 to 8, and more preferably m is 4.

The organo(poly)siloxane employed in admixture with at least one alkoxysilane is preferably hexaorganodisiloxane which is mixed with tetraalkoxysilane in a molar ratio of from 0.25 to 1.0. Hexamethydisiloxane admixed with tetraethyl silicate in a molar ratio of from 0.25 to 1.0 is preferably employed.

Moreover, the preferred organo(poly)siloxane admixed with at least one alkoxysilane is a cylic organosiloxane which is mixed with a trialkoxysilane and, in particular, a tetrameric cyclic organosiloxane mixed with a trialkoxysilane.

Only those mixtures of organo(poly)siloxanes which are free of alkoxy groups and have a maximum of 8 siloxane units per molecule and an alkoxysilane are used which result in solid organopolysiloxanes at room temperature.

Examples of hydrocarbon radicals represented by R having SiC-bonded organic radical are alkyl radicals, such as the methyl, ethyl, n-propyl, isopropyl, n-butyl, sec-butyl, amyl, hexyl, β-ethylhexyl and heptyl radicals; alkenyl radicals, such as the vinyl, allyl and butenyl radicals; alkynyl radicals; cycloalkyl radicals, such as the cyclobutyl, cyclohexyl and methylcyclohexyl radicals; aryl radicals, such as the phenyl radical; alkaryl radicals, such as tolyl radicals; and aralkyl radicals, such as the benzyl radical. The methyl, vinyl and phenyl radicals are examples of the preferred organic radicals.

Examples of substituted hydrocarbon radicals represented by R having SiC-bonded organic radicals are halogenated hydrocarbon radicals, such as the chloromethyl, 3-chloropropyl, 3-bromopropyl, 3,3,3-trifluoropropyl and 5,5,5,4,4,3,3-heptafluoropentyl radicals, and the chlorophenyl, dichlorophenyl and trifluorotolyl radicals; mercaptoalkyl radicals, such as the 2-mercaptoethyl and 3-mercaptopropyl radicals; cyanoalkyl radicals, such as the 2-cyanoethyl and 3-cyanopropyl radicals; aminoalkyl radicals, such as the 3-aminopropyl, N-(2-aminoethyl)-3-aminopropyl and N-(2-aminoethyl)-3-amino(2-methyl)propyl radicals; aminoaryl radicals, such as the aminophenyl radicals; acyloxyalkyl radicals, such as the 3-acryloxypropyl and 3-methacryloxypropyl radicals; hydroxyalkyl radicals, such as the hydroxypropyl radicals; and radicals of the formulas

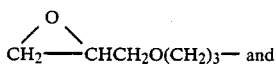

HOCH$_2$CH(OH)CH$_2$SCH$_2$CH$_2$—.

Examples of hydrocarbon radicals represented by $R^1$ are alkyl radicals, such as the methyl, ethyl, n-propyl, isopropyl, n-butyl, sec-butyl and tert-butyl radicals, and alkoxyalkylene radicals, such as the methoxyethylene and ethoxyethylene radicals. The methyl and ethyl radicals are examples of preferred $R^1$ radicals The specific examples of hydrocarbon radicals represented by $R^1$ also apply to the hydrocarbon radicals represented by $R^2$.

The emulsifiers used in preparing the silicone resin powders of this invention include carboxylic acids having from 9 to 20 carbon atoms, aliphatic-substituted benzenesulfonic acids having at least 6 carbon atoms in the aliphatic substituents, aliphatic-substituted naphthalenesulfonic acids having at least 4 carbon atoms in the aliphatic substituents, aliphatic sulfonic acids having at least 6 carbon atoms in the aliphatic substituents, silylalkylsulfonic acids having at least 6 carbon atoms in the aliphatic substituents, alkyl bisulfates having at least 6 carbon atoms in the alkyl substituents, quaternary ammonium halides and quaternary ammonium hydroxides. All the acids mentioned can be used as such, or if desired, mixed with their salts.

If anionic emulsifiers are used, it is advantageous to use those whose aliphatic substituents contain at least 8 and more preferably 12 carbon atoms. Specific examples of aliphatic substituents are octyl, decyl, dodecyl, cetyl, stearyl, myricyl, oleyl, nonenyl, octynyl, phytyl and pentadecadienyl radicals. The preferred anionic emulsifiers are aliphatic-substituted benzenesulfonic acids. If cationic emulsifiers are used, it is preferred that halides, and more preferably, chlorides and bromides be used.

The amount of emulsifier may be very low, measured from the extraordinarily small particle size of 10 to 150 nm of the aqueous colloidal suspension employed in the spray drying of organopolysiloxanes which are solid at room temperature. The emulsifier is preferably used in an amount of from 0.5 to 2.9 percent by weight, and more preferably in an amount of from 1.5 to 2.0 percent by weight, based on the weight of the organosilicon compound employed for preparing the silicone resin powder.

In many applications, however, emulsifiers which can be washed out or are capable of diffusion and accumulate at interfaces can have an interfering effect. When preparing the colloidal suspensions of organopolysiloxanes to be employed according to this invention, the emulsifiers described above may be replaced by addition salts of acetic acid with 3-aminopropyltrimethoxysilane or 3-aminopropyltriethoxysilane, and more preferably by addition salts of acetic acid with N-(2-aminoethyl)-3-aminopropyltrimethoxysilane or N-(2-aminoethyl)-3-aminopropyltrimethoxysilane or N-(2-aminoethyl)-3-aminopropyltriethoxysilane, which are hydrolyzed and condensed with the organosilicon compounds to be employed in this invention, and thereby incorporated into the organopolysiloxane structure.

In this case, 3-aminopropyltrimethoxysilane or 3-aminopropyltriethoxysilane and N-(2-aminoethyl)-3-aminopropyltrimethoxysilane or N-(2-aminoethyl)-3-aminopropyltriethoxysilane are preferably employed in an amount of from 5 to 20 percent by weight, and acetic acid in an amount of from 4 to 15 percent by weight, based on the weight of the organosilicon compound to be employed in accordance with this invention.

In addition, it is also possible to use addition salts of sodium sulfite with 3-glycidoxypropyltrimethoxysilane or 3-glycidoxypropyltriethoxysilane.

The aqueous colloidal suspensions of organopolysiloxanes, which are solid at room temperature, employed in preparing the silicone resin powders of this invention, are preferably prepared by adding the organosilicon compound to water in the presence of an emulsifier at a maximum rate of about 5 moles of organosilicon compound per liter of water, and more preferably from 0.5 to 1.0 mole of organosilicon compound per hour per liter of water, and subsequently removing the hydrolytically-formed alkanol by distillation. The aqueous colloidal suspensions of organopolysiloxanes which are solid at room temperature employed for spray drying can be prepared in an acidic, neutral or alkaline medium. The preparation preferably takes place at from 15° to 90° C., and more preferably from 60° to 85° C., and preferably at the pressure of the surrounding atmosphere, i.e., at 1020 hPa (abs.) or about 1020 hPa (abs.).

The process for preparing the aqueous, colloidal suspensions of organopolysiloxanes which are solid at room temperature can be carried out batchwise, semi-continuously or continuously. It is preferably carried out in a continuous process.

The colloidal aqueous suspensions of organopolysiloxanes which are solid at room temperature are preferably prepared in accordance with the process described in German Patent Application No. P 37 17 075.9, in which an organosilicon compound and water are fed separately and continuously to a reactor, in which at least one of the two substances contain an emulsifier. The reactor can be a tubular reactor, a stirred kettle, a kettle cascade, a circulation reactor, a tray reactor or other similar type reactors If desired, the reactor is equipped with a warming or cooling device. A tubular reactor in which the water is added continuously at the beginning of the tubular reactor and the organosilicon compound continuously via several feed points which are arranged along the longitudinal axis of the tubular reactor is preferably employed. After a sufficient residence time in the reactor to allow for the hydrolysis and condensation of the organosilicon compound employed, the aqueous suspension emerges continuously from the reactor. The residence time is at least 5 minutes, preferably 30 to 60 minutes The alkanol formed on hydrolysis is continuously removed by distillation from the aqueous suspension emerging from the reactor. The alkanol is preferably removed by molecular distillation, although thin-film evaporators, for example, are suitable for this purpose In order to increase the solids content of the organopolysiloxane, the aqueous suspension is continuously fed back into the reactor, where the organosilicon compound, and if appropriate, emulsifier are again fed continuously to it. If desired, the aqueous suspension can be recirculated several times until the desired organopolysiloxane solids content is obtained. Some of the aqueous suspension produced having the desired organopolysiloxane solids content is then removed continuously, and the remainder is continuously fed back into the reactor and again mixed continuously with water, organosilicon compound and emulsifier.

The aqueous colloidal suspensions of organopolysiloxanes, which are solid at room temperature, employed in preparing the silicone resin powders of this invention preferably have a solids content of up to about 20 percent by weight, based on the total weight of the suspension. The aqueous suspensions are essentially free of alkanol and preferably have a flashpoint above about 55° C. (determined in accordance with DIN 53 213), which means that they are highly suitable for spray drying.

The spray drying can be carried out in any desired apparatus, which is suitable for spray-drying liquids, for example, those having at least one vortex atomizer nozzle or having a rotating atomizer disk, in a dry-gas stream, and more preferably in warmed dry-gas stream.

The input temperature of the dry-gas stream, which is usually air, is preferably from 100° C. to 300° C., and more preferably from 140° C. to 180° C. and the output temperature of the gas stream formed on drying is from 60° to 100° C., and more preferably from 80° to 90° C.

The silicone resin powders prepared in accordance with this invention have a particle size of from 1 to 100 $\mu$m, are spherical and have a narrow grain-size distribution. They can also contain loose agglomerates of primary particles (particle diameters of from 10 to 150 nm) of the colloidal suspension. Powders having a specific surface area up to about 500 m$^2$/g (determined by nitrogen adsorption in accordance with ASTM Special Technical Publication No. 51, 1941, pages 95 ff., i.e, the so-called "BET method") can thereby be obtained. The resultant silicone resin powders of this invention cannot be redispersed in water.

In addition to the organopolysiloxane and emulsifier, the powders of this invention may also contain additional substances, which may also be sprayed in the process of this invention. Examples of such additional substances are, for example, fungicides, antifoaming agents, soluble dyes, pigments, fillers having a minimum surface area of 50 m$^2$/g, such as pyrogenically produced silicon dioxide, and fillers having a surface area less than 50 m$^2$/g, such as chalk powder, calcium carbonate needles and quartz powder.

Silicone resin powders consisting of a wide variety of chemical compositions and functionalities of the siloxane units, for example, containing monoorganosiloxane units, diorganosiloxane units or $SiO_{4/2}$ units and triorganosiloxane units are obtained by the process of this invention. However, in the case of silicone resin powders prepared from identical siloxane units, for example, siloxane units containing only one SiC-bonded organic radical, powders having, for example, different melting points or residual hydroxyl contents or residual alkoxy contents can be obtained depending on the production of the aqueous colloidal suspensions of organopolysiloxanes employed in the spray drying (variation of the pH, emulsifier or temperature).

The silicone resin powders can be used in place of finely divided silica which has been rendered hydrophobic, thus, for example, as fillers in plastics. In addition, they can be used as additives in paint and other coating systems, as flatting agents, as toner additives, or as flow additives for solids.

EXAMPLE 1:

(a) Three liters of water and in each case the emulsifier specified in Table 1 are introduced into a 5 liter three-neck flask equipped with stirrer, dropping funnel, thermometer and distillation attachment, and the mixture is warmed to 65° C. The organosilicon compound shown in Table 1(a) is metered in with stirring at 65° C. and at about 300 hPa (abs.) over a period of 5 hours through a capillary extending into the flask. The methanol produced on hydrolysis is at the same time removed by distillation, the pressure being regulated so that the volume of the contents in the flask remains constant during the silane addition When the silane addition is complete, constant stirring is continued for one-half hour at 65° C. and at about 300 hPa (abs.). The aqueous suspensions (A) to (E) can then be filtered, if desired, through a nylon net.

Phenyltrimethoxysilane is employed to produce suspensions (C) and (D), suspension (C) is produced in an acidic medium at a pH of 2.0, and suspension (D) in an alkaline medium at a pH of 9.5.

The emulsifier employed in the production of suspension (E) is an addition salt of acetic acid with N-(2-aminoethyl)-3-aminopropyltrimethoxysilane. The acetic acid is initially introduced together with water, and N-(2-aminoethyl)-3-aminopropyltrimethoxysilane is added dropwise thereto together with the methyltrimethoxysilane.

Aqueous suspensions of organopolysiloxanes (A) to (E) are obtained, having the values shown in Table 1(a) for the mean particle diameter, determined by electronmicroscopy, the viscosity and the solids contents of the organopolysiloxane.

(b) Each of the aqueous suspensions obtained under (a) is converted, in a spray drier operating with a vortex vaporizer nozzle (Nubilosa AJM 014, "Nubilosa" is a registered trademark) at a nozzle pressure of 5000 hPa (abs.), a throughput of 2 liters/hour, an air inlet temperature of 170° C. and a gas outlet temperature of 85° C., to form a free-flowing powder which cannot be redispersed in water.

Table 1(b) shows the mean particle diameter, the specific surface area, the apparent density, the weight loss and the methanol number for each of the powders (A) to (E) thus obtained.

Powders (C) and (D) are both "phenylsilicas", but have different properties. Thus, powder (C) has a melting point of 92° C., whereas powder (D) does not have a melting or softening point below 350° C. Powder (C) has a high residual hydroxyl content or residual methoxy content of 25 mol percent, while powder (D) has a low content of 5 mol percent.

Powder (E) is free of emulsifiers which can be washed out.

TABLE 1(b)

| | Powder | | | | |
|---|---|---|---|---|---|
| | D [um][4] | $S_{Sp}$ [m²/g][5] | $G_S$ [g·cm$^{-3}$][6] | H$_2$O[Percent by weight][7] | MeOH number[8] |
| (A) | 5 | 403 | 0.36 | 0.4 | 20–30 |
| (B) | 9 | 199 | 0.30 | 1.1 | 15–25 |
| (C) | 12 | 5 | 0.38 | 0.9 | 15–25 |
| (D) | 10 | 39 | 0.40 | 0.5 | 20–30 |
| (E) | 12 | 4 | 0.33 | 4.5 | 20–30 |

[4] Mean particle diameter, determined by means of scanning electronmicroscopy (1000 particles measured).
[5] BET specific surface area (determined by nitrogen absorption in accordance with ASTM Special Technical Publication No. 51, 1941, pages 95 ff.).
[6] Apparent density.
[7] Weight loss, based on the total weight of the powder, after drying for two hours at 105° C. (determined in accordance with DIN 53 198).
[8] Percent by weight of methanol/water mixture, based on the total weight of the mixture, which just wets the sample.

EXAMPLE 2:

(a) Four liters per hour of the water/emulsifier mixture from Table 2(a) are in each case introduced continuously with the aid of a hose pump into a tubular reactor having a 4 liter capacity and 3 cm internal diameter, the contents of the reactor are kept at the temperature specified in Table 2(a) in each case. The respective organosilicon compound shown in Table 2(a) is added continuously with the aid of a metering pump at the volume flow (1/h) given in Table 2(a) to the water/emulsifier mixture via five different feed points arranged along the longitudinal axis of the tubular reactor in the first third of the tubular reactor. The reaction mixture emerging from the tubular reactor is transferred continuously into a thin-film evaporator. An alkanol/water mixture is continuously removed by distillation in the thin-film evaporator. The temperature and circulation rate of the thin-film evaporator are in each case selected so that the same volume is distilled off in each case per unit of time as added through the organosilicon compound. After the distillation, the aqueous suspension is fed back continuously into the tubular reactor and then re-charged with the organosilicon compound. After four passes, a quarter of the volume flow of the colloidal aqueous suspension is in each case removed continuously, three quarters of the volume flow are fed back continuously into the tubular reactor, and a quarter of the volume flow of the fresh water/emulsifier mixture is introduced continuously.

TABLE 1(a)

| | Suspension Organosilicon Compound | Emulsifier | Solids content[2] [Percent by weight] | Viscosity [mPa.s at 25° C.] | d³ [nm] |
|---|---|---|---|---|---|
| (A) | 1175 g of methyltrimethoxysilane | 3.5 g of dodecylbenzenesulfonic acid<br>13.5 g of sodium dodecylbenzene sulfonate | 19 | 6.6 | 15 |
| (B) | 485 g of methyltrimethoxysilane<br>527.5 g of vinyltrimethoxysilane (1:1)[1] | 3.5 g of dodecylbenzenesulfonic acid<br>13.5 g sodium dodecylbenzene sulfonate | 17 | 5.8 | 22 |
| (C) | 690 g of phenyltrimethoxysilane | 12.5 g of dodecylbenzenesulfonic acid | 15 | 12.4 | 37 |
| (D) | 825 g of phenyltrimethoxysilane | 20 g hexadecyltrimethyl-[+] ammonium chloride | 18 | 5.4 | 34 |
| (E) | 702.5 g of methyltrimethoxysilane<br>86 g of N-(2-aminoethyl)-3-aminopropyltrimethoxysilane[0]<br>(93.7)[1] | 55 g acetic acid[0] | 15 | 22.0 | 66 |

[+] pH adjusted using N-methylethanolamine.
[0] Emulsifier in (E) is an addition salt of acetic acid with N-(2-aminoethyl)-3-aminopropyltrimethoxysilane.
[1] Molar ratio.
[2] Solids content of organopolysiloxane in the suspension in percent by weight, based on the total weight of the suspension.
[3] Mean particle diameter determined by electronmicroscopy.

The organosilicon compound from Table 2(a) is added continuously in each case via the five feed points, as described above, at a constant volume flow (l/h) as specified in Table 2(a).

Aqueous suspensions of organopolysiloxanes (F) to (H) are obtained having the values specified in Table 2(a) for the mean particle diameter, determined by electronmicroscopy, the viscosity and the solids content of the organopolysiloxane. (b) Each of the aqueous suspensions obtained in (a) above is spray dried as described in Example 1(b).

Free-flowing powders (F) to (H) are obtained which cannot be redispersed in water. Values for the mean particle diameter, specific surface area, apparent density, weight loss and methanol number are given in Table 2(b).

Powder (G) has a melting point of 185° C. and is readily soluble in aromatic and polar aprotic solvents.

TABLE 2(a)

| | Organosilicon Compound | [l/h] | Suspension Emulsifier [in liter of H$_2$O] | T [°C.] | Solids content[2] [Percent by weight] | Viscosity [mPa.s at 25° C.] | d[3] [nm] |
|---|---|---|---|---|---|---|---|
| (F) | 320 g/h of methyltrimethoxysilane 70.5 g/h of dimethyldimethoxysilane (4:1)[1] | 0.42 | 5.0 of g dodecylbenzenesulfonic acid | 65 | 17 | 5.4 | 50 |
| (G) | 100 g/h of hexamethyldisiloxane 257 g/h of tetraethyl silicate (0.5:1)[1] | 0.40 | 5.0 g of dodecylbenzenesulfonic acid | 85 | 17 | 3.3 | 130 |
| (H) | 70 g/h of hexamethyldisiloxane 358 g/h of tetraethyl silcate (0.25:1)[1] | 0.47 | 4.5 g of dodecylbenzenesulfonic acid | 85 | 16 | 3.2 | 122 |

[1]Molar ratio.
[2]Solids content of organopolysiloxane in the suspension in percent by weight, based on the total weight of the suspension.
[3]Mean particle diameter determined by electronmicroscopy.

TABLE 2(b)

| | D[um][4] | Powder $S_{Sp}$[m$^2$/g][5] | $G_S$[g·cm$^{-3}$][6] | H$_2$O[Percent by weight][7] | MeOH number[8] |
|---|---|---|---|---|---|
| (F) | 6 | 194 | 0.40 | 0.6 | 30–40 |
| (G) | 16 | 17 | 0.36 | 3.9 | 10–35 |
| (H) | 14 | 19 | 0.48 | 3.5 | 10–40 |

[4]Mean particle diameter, determined by means of scanning electronmicroscopy (1000 particles measured).
[5]BET specified surface area (determined by nitrogen adsorption in accordance with ASTM Special Technical Publication No. 51, 1941, pages 95 ff.).
[6]Apparent density.
[7]Weight loss, based on the total weight of the powder, after drying for two hours at 105° C. (determined in accordance with DIN 53 198).
[8]Percent by weight of methanol/water mixture, based on the total weight of the mixture, which just wets the sample.

What is claimed is:

1. A process for preparing a silicone resin powder which comprises forming an aqueous colloidal suspension of an organopolysiloxane by adding an organosilicon compound selected from the group consisting of
   (a) at least one alkoxysilane;
   (b) a partial hydrolyzate of (a);
   (c) a mixture of (a) and (b);
   (d) a mixture of an organo(poly)siloxane which is free of alkoxy groups and has a maximum of 8 siloxane units per molecule with (a)
   (e) a mixture of an organo(poly)siloxane which is free of alkoxy groups and has a maximum of 8 siloxane units per molecule with (b); and
   (f) a mixture of an organo(poly)siloxane which is free of alkoxy groups and has a maximum of 8 siloxane units per molecule with (a) and (b) to water in the presence of an emulsifier at a maximum rate of 5 moles of organosilicon compound per hour per liter of water, distilling off the hydrolytically-formed alkanol and thereafter spray drying the resultant aqueous suspension.

2. The process of claim 1, wherein the organopolysiloxane has units of the formula $$R_x Si(OR^1)_y O_{\frac{4-x-y}{2}}$$

in which R is selected from the group consisting of a hydrogen atom, a monovalent hydrocarbon radical having from 1 to 8 carbon radical in which the substituents are inert to water, R$^1$ is selected from the group consisting of a hydrogen atom, an alkyl radical and an alkoxyalkylene radical having from 1 to 4 carbon atoms per radical, x is 0, 1, 2 or 3, with an average of from 1.0 to 2.0 and y is 0, 1 or 2, with an average of from 0.0 to 0.5.

3. The process of claim 1, wherein the amount of emulsifier ranges from about 0.5 to 2.9 percent by weight based on the weight of the organosilicon compound.

4. The process of claim 1, wherein the organosilicon compound is added to water at a rate of from 0.5 to 1.0 mole of organosilicon compound per hour per liter of water.

* * * * *

UNITED STATES PATENT AND TRADEMARK OFFICE
CERTIFICATE OF CORRECTION

PATENT NO. : 4,935,484

DATED : June 19, 1990

INVENTOR(S) : Dr. Matthias Wolfgruber, Dr. Bernward Deubzer and Dr. Volker Frey

It is certified that error appears in the above-identified patent and that said Letters Patent is hereby corrected as shown below:

Column 10, line 45, after "carbon" insert --- atoms per radical and a substituted monovalent hydrocarbon ---.

Signed and Sealed this

Eleventh Day of June, 1991

Attest:

Attesting Officer

HARRY F. MANBECK, JR.

Commissioner of Patents and Trademarks